United States Patent
Files et al.

(10) Patent No.: US 11,418,931 B2
(45) Date of Patent: Aug. 16, 2022

(54) METHOD AND APPARATUS FOR OPERATING A THIN CLIENT ACROSS A 5G INFRASTRUCTURE

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

(21) Appl. No.: 16/841,627

(22) Filed: Apr. 6, 2020

(65) Prior Publication Data

US 2021/0314744 A1    Oct. 7, 2021

(51) Int. Cl.
| | |
|---|---|
| *H04W 4/20* | (2018.01) |
| *G06F 13/42* | (2006.01) |
| *H04W 4/02* | (2018.01) |
| *G06F 9/54* | (2006.01) |

(52) U.S. Cl.
CPC ............ *H04W 4/20* (2013.01); *G06F 9/541* (2013.01); *G06F 13/4282* (2013.01); *H04W 4/025* (2013.01); *G06F 2213/0026* (2013.01)

(58) Field of Classification Search
CPC ......... H04W 4/20; H04W 4/025; G06F 9/541; G06F 13/4282; G06F 2213/0026
USPC ............... 455/418, 414.1, 550.1, 566, 425
See application file for complete search history.

(56) References Cited

U.S. PATENT DOCUMENTS

| | | | |
|---|---|---|---|
| 7,636,499 B1* | 12/2009 | Arant | G06Q 30/06 |
| | | | 382/305 |
| 2018/0183855 A1 | 6/2018 | Sabella | |
| 2020/0051309 A1 | 2/2020 | Labbe | |
| 2020/0186857 A1* | 6/2020 | Easley | H04N 21/25841 |
| 2020/0193858 A1* | 6/2020 | Bulut | G09B 7/00 |
| 2020/0294179 A1* | 9/2020 | Ray | G06F 12/084 |

FOREIGN PATENT DOCUMENTS

| | | |
|---|---|---|
| CN | 107770298 A | 3/2018 |
| WO | 2011/031373 A2 | 3/2011 |
| WO | 2012/109078 A2 | 8/2012 |
| WO | 2016/054699 A1 | 4/2016 |
| WO | 2017/161361 A2 | 9/2017 |
| WO | 2019/178470 A1 | 9/2019 |

* cited by examiner

*Primary Examiner* — Nghi H Ly
(74) *Attorney, Agent, or Firm* — Prol Intellectual Property Law, PLLC; H. Kenneth Prol

(57) ABSTRACT

An information handling system operating as a thin client across a 5G infrastructure may include a wireless network interface device to communicate with a 5G communication network using a mm-wave antenna transceiver; an input/output (I/O) controller to send user input across to the 5G communication network to a backend server via a 5G antenna transceiver; and a graphical processing unit (GPU) to: transmit graphics data across the 5G communication network; and receive application program interface (API)-processed graphics data across the 5G communication network from the backend server descriptive of a user interface to be displayed on a video display communicatively coupled to the GPU.

20 Claims, 9 Drawing Sheets

METHOD AND APPARATUS FOR OPERATING A THIN CLIENT ACROSS A 5G INFRASTRUCTURE

FIELD OF THE DISCLOSURE

The present disclosure generally relates to security of data accessed by mobile information handling systems, and more specifically to providing for access to reliable remote computing capabilities via a 5G wireless communication network to mobile computing systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may require computing resources to assist with task completion.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
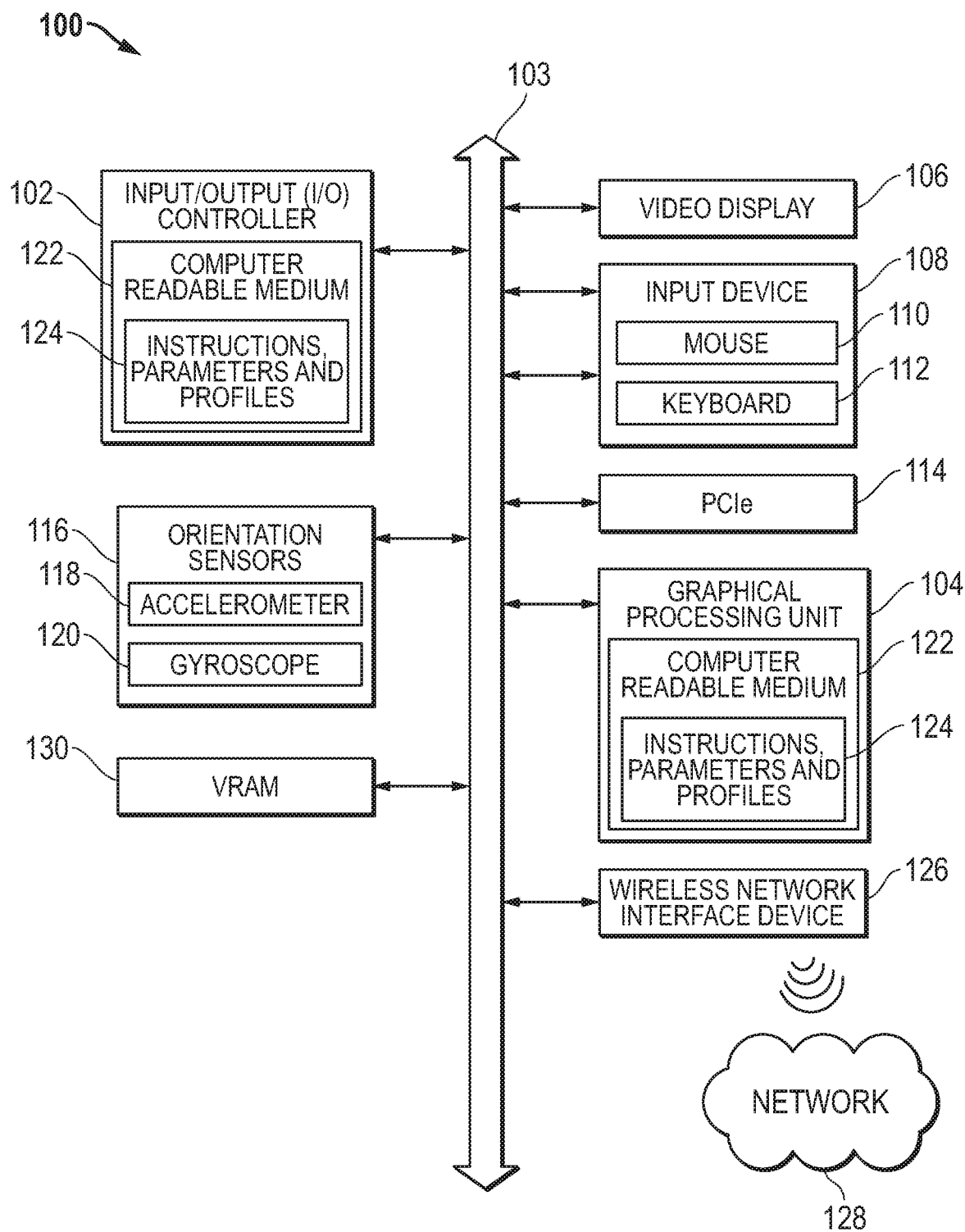
FIG. 1 is a block diagram illustrating a thin client information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily, tasks previously completed on "fat" information handling systems are now being completed on thinner client devices. A "thin" client, for purposes of the present specification, is an information handling system that has been optimized for establishing a remote connection with a server-based computing environment such as a data processing backend across a 5G communication network. As such, some or all of the data processing that would otherwise be conducted on the information handling system is conducted at the backend server instead. Such data processing may include extended computing at everyday items including Internet of Things (IoT) systems that may monitor, provide services or information, or operate to control other systems at extended locations through places of work, residence, public spaces, or elsewhere. Other data processing may include graphics data processing previously computed by a graphical processing unit (GPU) of the information handling system that, according to the embodiments of the present specification, are processed by the at the backend server across the 5G communication network.

With many of these systems, there is a competing need to keep mobile devices lightweight and decrease battery consumption. One solution to these contrasting needs and presented herein is to pass processing and other computational processes to a backend server across a 5G communication network. In an embodiment, one of these processes may include the processing graphics data representative of a user interface to be presented on a video display at the information handling system. These services may be available, on command, via, in an embodiment, a peripheral component interconnect express (PCIe) that is transparently bridged over the 5G communication network so as to allow any executed graphics application programming interfaces (APIs) to gain direct access to the GPU of the information handling system. In an embodiment, the services may be made available by directly transporting any graphics APIs over the 5G communication network. PCI Express or PCIe is a serial connection that operates somewhat like a network as well as a bus. Instead of one bus that handles data from multiple sources, PCIe has a switch that controls several point-to-point serial connections. These connections fan out from the switch, leading directly to the devices where the data needs to go. Various information handling system devices have dedicated connections, so devices do not necessarily share bandwidth like they would on other bus formats.

In addition, any user input may be relayed over the 5G communication network for consumption and processing at the backend server. This allows for real-time remote sensor processing for any user interface actions from, for example, a touchscreen video display, a keyboard, a mouse, or any other type of input device at the information handling system. Any latency, dependency, and throughput of 5G communication network infrastructure may enable the ability for user input to be transmitted to the backend server. The user input may be processed, along with any graphics data received by the backend server from the GPU, and corresponding output may be transmitted back to the information handling system within a frame. With the significantly reduced or no latency resulting from this method and system described herein, the costs for additional hardware present in the information handling system may be significantly reduced. With the reduction in hardware present in the thin client information handling system, the costs associated with the administration and information technology (IT) support associated with the information handling system. In addition to the reduction in reduction in power consumption at the information handling system, compute resources may be reallocated and redistributed in real-time at the backend server in an as-needed arrangement. In this embodiment, where a relatively high-compute task is initiated at the information handling system, the backend server may expand resource allocation to satisfy the higher resource requirements to process that high-compute task.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, an IoT device, a wireless gateway, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. Information handling system 100 may execute code instructions for all or any portion of the input/output (I/O) controller 102, the graphical processing unit (GPU) 104, and the orientation sensors 116 according to embodiments described herein. For example, the information handling system 100 can represent a thin client information handling system communicatively coupled to a 5G communication network. A thin client device may be any information handling system 100 that has been optimized for establishing a remote connection with a server-based computing environment such as a data processing backend across a 5G communication network. In some embodiments, the information handling system 100 may include a wireless network interface device 126 that allows the information handling system 100 to transmit data across a 5G communication network and to a backend server used to process I/O data form the I/O controller 102 and graphics data from the GPU 104.

The I/O controller 102, the GPU 104, the orientation sensors 116, and the PCIe module 114 of various embodiments of the present disclosure that may operate in some example embodiments as a software agent, in whole or in part, within a client information handling system, or at one or more mobile information handling systems 100. The PCIe module 114 may include some or all of a PCIe chipset, busses, and connection to wireless transmitter to establish a high-speed serial computer expansion bus for connectivity from a thin client GPU and I/O controller to backend GPU, CPU, memory and other resources via one or more wireless links. The one or more wireless link may be a 5G NR wireless link and, in some embodiments, may even operate parallel wireless links to create PCIe lanes for high speed connectivity for a client information handling system to a backend server processing resources according to various embodiments herein. The information handling system 100 may also represent a networked server or other system and administer some or all aspects of the instructions executed at the information handling system 100 according to various embodiments herein involving remote operation of such systems.

For example, an information handling system 100 may be any mobile or other computing device capable of executing a set of instructions (sequential or otherwise) that specify actions to be taken by that machine. In an embodiment of the present disclosure, the information handling system 100 may be any mobile or other computing device capable of sending data over a 5G communication network to be executed by a processor at a backend computing device and receiving corresponding executed data from that backend server. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described herein, and operates to perform one or more of the methods described herein. The information handling system 100 may execute code instructions 124, including that of the GPU 104 and the I/O controller 102, that may operate on servers or systems, remote data centers, or on-box in individual client information handling systems according to various embodiments herein. In some embodiments, it is understood any or all portions of code instructions 124 may operate on a plurality of information handling systems 100.

In an embodiment, the information handling system 100 may include a processor (not shown) such as a central processing unit (CPU), control logic or some combination of the same. Any of the processing resources may operate to execute code that is either firmware or software code. Moreover, the information handling system 100 can include memory such as video random access memory (VRAM) 130, static memory, computer readable medium 122 storing instructions 124 of the information handling system 100, and drive unit (not shown) (volatile (e.g. random-access memory, etc.), nonvolatile (read-only memory, flash memory etc.) or any combination thereof). The information handling system 100 can also include one or more buses 103 operable to transmit communications between the various hardware components such as any combination of various input and output (I/O) devices.

As shown, the information handling system 100 may further include a video display 106. The video display 106 in an embodiment may function as a liquid crystal display (LCD), an organic light emitting diode (OLED), a flat panel display, or a solid-state display. Additionally, the information handling system 100 may include an alpha numeric input device such as a keyboard 112, and/or a cursor control device, such as a mouse 110, touchpad, or gesture or touch screen input. In an embodiment, the information handling system may include a number of orientation sensors 116 such as an accelerometer 118 and a gyroscope 120 capable of measuring an acceleration of a mobile information handling system 100 and the orientation of the information handling system 100.

The information handling system 100 may also include a wireless network interface device 126. The wireless network interface device 126 represents a network interface controller (NIC) disposed within information handling system 100, on a main circuit board of the information handling system, integrated onto another component such as processor, in another suitable location, or a combination thereof. The wireless network interface device 126 may include another information handling system 100, a data storage system, another network, a grid management system, another suitable resource, or a combination thereof. The wireless network interface device 126 in an embodiment may operably connect to a wireless or wired network 128. Connection to network 128 may be wired or wireless.

The wireless network interface device 126 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. A wireless adapter may be used and may include one or more radio frequency subsystems with transmitter/receiver circuitry, wireless controller circuitry, amplifiers and other circuitry for wireless communications. The wireless adapter may also include antenna system which may be tunable antenna systems for use with the system and methods disclosed herein. In an embodiment, the antenna systems may include 5G new radio (NR) mm-wave antenna systems that are capable of communicatively coupling the information handling system 100 to a 5G communication network. The radio frequency subsystems include wireless controllers to manage authentication, connectivity, communications, power levels for transmission, buffering, error correction, baseband processing, and other functions of the wireless adapter.

The information handling system 100 can include a set of instructions 124 that can be executed to cause the computer system to perform any one or more of the methods or computer based functions disclosed herein. For example, instructions 124 may execute the GPU 104, the I/O controller 102, software agents, or other aspects or components. The instructions 124 may be executed to send user input across to the 5G communication network to a backend server via a 5G antenna transceiver from the I/O controller 102. The instructions 124 may be executed to transmit graphics data across the 5G network from the GPU 104 and receive application program interface (API)-processed graphics data across the 5G communication network from the backend server descriptive of a user interface to be displayed on a video display 106 communicatively coupled to the GPU 104.

Various software modules comprising application instructions 124 may be coordinated by an operating system (OS), and/or via an application programming interface (API). As described herein, the various software modules comprising application instructions 124 may be partially or entirely transmitted to a backend server on a 5G NR wireless network by the I/O controller 102 and/or the GPU 104 via a PCIe module 114. This may be done so that some, a majority of, or all of the processing is completed by the backend server instead of the information handling system 100. Because the information handling system 100 described herein is a thin client-type information handling system, the present specification contemplates that a vast majority of processing, including graphical processing, are completed by the backend server such that the GPU 104 receives the processed data and displays output to the user via the video display 106. As described herein, the information handling system 100 may send any graphical data and input data to the backend server and receive, as processed data, graphical output data, by frame, at the GPU to be displayed or otherwise represented at the video display 106.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a wearable computing device, a palmtop computer, a laptop computer, a desktop computer, a communications device, an access point (AP), a base station transceiver, a wireless telephone, a control system, a camera, a scanner, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit (not shown), the I/O controller 102, the GPU 104, the orientation sensors 116, the input device 108, and PCIe may include a computer-readable medium 122 in which one or more sets of instructions 124 such as software can be embedded. Similarly, a main memory (not shown) and a static memory (not shown) may also contain a computer-readable medium for storage of one or more sets of instructions, parameters, or profiles 124 for storing and displaying a video frame or a plurality of sequentially loaded video frames at the video display 106. The disk drive unit and static memory also contain space for storing data related to the input from a user to be sent to the backend server, graphical data to be sent to the backend server, and any computer executable program code used to transmit these types of data. Further, the instructions 124 may embody one or more of the methods or logic as described herein. For example, instructions relating to sending user input across to the 5G communication network to a backend server via the 5G antenna transceiver and transmitting the graphics data across the 5G network may be stored here. In a particular embodiment, the instructions, parameters, and profiles 124 may reside completely, or at least partially, within the main memory, the static memory, and/or within the disk drive during execution by the GPU 104 or any other processor or controller of information handling system 100.

Any memory described herein, including the VRAM 130, may contain computer-readable medium (not shown), such as RAM in an example embodiment. An example of any memory descried herein includes random access memory (RAM) such as static RAM (SRAM), dynamic RAM (DRAM), non-volatile RAM (NV-RAM), or the like, read only memory (ROM), another type of memory, or a combination thereof. Any static memory may contain computer-readable medium (not shown), such as NOR or NAND flash memory in some example embodiments. The information handling system 100 and the drive unit may include a computer-readable medium 122 such as a magnetic disk in an example embodiment. The computer-readable medium may be a single medium, but the term "computer-readable medium" may include a single medium or multiple media, such as a centralized or distributed database, and/or associated caches and servers that store one or more sets of instructions. The term "computer-readable medium" shall also include any medium that is capable of storing, encoding, or carrying a set of instructions for execution by the GPU 104, the I/O controller 102, or any other processing device that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described, the information handling system 100 includes an I/O controller 102. The I/O controller 102 may be any processing device that receives input from the input devices 108 such as the mouse 110, the keyboard 112, or any other input device such as a touchscreen at the video display 106. The input data is created via the use of the mouse 110, the keyboard 112, or touchscreen by the user. Upon receipt of this input data at the I/O controller 102, the I/O controller 102 may send the user input across to a 5G communication network to a backend server via the 5G antenna transceiver. In an embodiment, in order to accomplish this the I/O controller 102 may implement a PCIe module 114 bridged over the 5G communication network to allow any output/input application program interfaces (APIs) to directly access or allow direct access to the I/O controller 102. Further I/O controller 102 would operate a basic input output system (BIOS) for coordinating functions of a thin client according to embodiments herein. Thin client in some embodiments herein is also referred to as a skinny client.

During operation of the information handling system 100, the output is sent to a backend server over a 5G communication channel. In an embodiment herein, the input from the user at the mouse 110, the keyboard 112, or any other input device is detected in real-time, sent to the backend server, and processed by that backend server. Because of the high data transmission rates associated with the 5G NR communication network, the data from the I/O controller 102 regarding input at the mouse 110, the keyboard 112, and the touchscreen may be received concurrently with the data from the GPU 104. As described herein, the backend server may be accessible to core middleware or other type of cloud computing infrastructure on a 5G NR communication network 128. In an embodiment, the core middleware may include a parallel programming environment that allows for the concurrent use of multiple computing resources to process, send, and receive data. In an embodiment, the core middleware may include structured data management processes that organize, manage, and store data in a format appropriate for efficient access and modification by the core middleware. In an embodiment, the core middleware may include a distributed file system that allows a plurality of information handling systems 100 and/or the backend server to have access to data and allows for operations to be executed on that data such as creation of data, deletion of data, modification of data, writing data, and reading data. In an embodiment, the core middleware may coordinate the operations of a plurality of backend servers that may each include or have access to computing devices such as GPUs, CPU, or other controllers used to accomplish the functionalities of the information handling system 100 described herein.

As described, the information handling system 100 includes an GPU 104. The GPU 104 may transmit graphics data across the 5G communication network to the backend server. The graphics data may include any data used by the GPU to define an image to be presented on the video display 106. In an embodiment, this data may include primitive data, rasterization data, shading data, and vector data that originates from computer readable program code defining any type of application such as a word processing application, a gaming application, a computer-aided design (CAD) application, or any other type of application that receives input from a user via the I/O controller 102. Among these examples, a relatively high amount of graphical data, especially with CAD applications and gaming applications, are processed using the backend server to which the information handling system 100 is communicatively coupled to via a 5G NR antenna and across a 5G communication network.

In an embodiment, the information handling system 100 may interface with a backend server operating under a mobile backend as a service (MBaaS) model. In this example, the information handling system 100 may include software development kits (SDKs) and application programming interfaces (APIs) that allow limited amounts of computer executable program code to be maintained on the information handling system 100 sufficient to allow the information to access and utilize storage, processing, and application resources across a communication network (e.g., 5G NR communication network). In these embodiments, the resources offered by the backend server may be offered to the information handling system 100 as a software licensing and delivery model (e.g., Software as a Service (SaaS)) in which software (e.g., computer executable program code) is licensed on a subscription basis and is centrally hosted at the backend server for use by the information handling system. As such, operations to be executed by the I/O controller 102 and the GPU 104 may be processed at the backend server instead of the information handling system 100. This allows real-time input to be sent across the 5G NR communication network by the I/O controller 102 and received at the backend server along with any graphics data from the GPU 104 to be processed. Upon parallel or concurrent processing of the data received by the I/O controller 102 and graphical data received by the GPU 104, the backend server may create an output frame to be sent back to the information handling system over the 5G communication network and stored on the VRAM 130 for display at the video display 106. This operation may occur for all input data received by the I/O controller 102 from any input device (e.g., mouse 110, keyboard 112, touchscreen) as well as for any graphical data sent by the GPU 104 to the backend server. The latency, dependency, and throughput capabilities of the 5G communication infrastructure enables the information handling system to transmit user input to the backend server, have that input processed along with the graphics data described herein, and output (e.g., transmitted) back to the information handling system 100 within a single video frame. This results in little or no user-detectable lag or latency in data processing creating the illusion that the thin client device (described herein as the information handling system 100) is executing all processes while still reducing the hardware within the thin client and the power consumed. As a result of the reduced hardware present within the information handling system 100, hardware costs and information technology (IT) administration and support costs. Those resources at the backend server may be reallocated and/or allocated at real-time based on the amount of data to be processed from the information handling system 100. In examples where relatively high resource applications are being executed, the resources at the backend server may be expanded to satisfy the computing needs.

In an embodiment, the information handling system 100 includes a PCIe module 114. The PCIe module 114 may include a high-speed serial computer expansion bus standard used as the interface between the GPU 104 and I/O controller 102 and the wireless network interface device 126. In the embodiments described herein, the PCIe module 114 may be transparently bridged over the 5G communication network to allow graphics APIs to directly access the GPU 104 and transmit the data used to form the frames at the backend server as described herein. In an alternative embodiment, any graphics APIs (e.g., DirectX® API developed by the Microsoft® corporation of One Microsoft Way, Redmond, Wash., USA; OpenGL® developed by the Khronos Group; Direct3D® developed by Microsoft®, CUDA developed by NVIDIA® of Santa Clara, Calif., USA; and the video graphics array (VGA) standards) may be directly transported over the 5G communication network. In an embodiment, when the link between the PCIe and the backend server is initiated, the lane count may be negotiated based on a number of lanes supported by the information handling system 100 and the bandwidth available on the 5G NR communication network. By way of example, a PCIe v4 may support ×1, ×2, ×4, ×8, and ×16 lanes. A maximum throughput on the 5G communication network may be around 10 GB/s which results in the maximum lanes of ×4. Where the quality is lower than this maximum, a lower lane count may be negotiated to maintain a quality of service of data transmission.

The data link layer of the PCIe module 114 may interface with the open wireless architecture layer of the 5G NR wireless communication infrastructure in order to sequence any transaction layer packets (TLPs) that are generated by a transaction layer of the PCIe module 114, ensure reliable delivery of TLPs between the information handling system 100 and the backend server via an acknowledgement protocol (e.g., acknowledge (ACK) and negative acknowledgement (NAK) signaling) that explicitly requires replay of unacknowledged/bad TLPs, and initialize and manage flow control credits. By bridging the PCIe module 114 over the 5G communication network the high data transmission rates of the TLPs may be realized.

The information handling system 100 further includes any number of orientation sensors 116. Among these orientation sensors 116 may include an accelerometer 118 and a gyroscope 120. The accelerometer 118 and gyroscope 120, along with any other type of orientation sensor, may gather orientation data descriptive of an orientation of the information handling system 100 and provide the orientation data to the I/O controller 102. The orientation data may be used by the information handling system 100 to detect which orientation the information handling system 100 is in so that any wireless network interface device 126 and/or 5G antenna systems are to be activated or operated. The orientation sensors may be utilized in determining any directionality of 5G NR antenna arrays in operation with respect to 5G access points (APs). In an embodiment, the information handling system 100 may include a 5G NR antenna or array of 5G NR antennas used to communicatively couple the information handling system 100 to one of a plurality of access points (APs) of the 5G communication network. The APs may allow the information handling system 100 to be communicatively coupled to the backend server within the 5G communication network.

As described, the information handling system 100 may further include a VRAM 130. The VRAM 130, or video random access memory, may be any memory device that stores the framebuffer for graphic adapters. In the present specification, the VRAM 130 may be used to, for any length of time, any number of video frames created by the backend server. The frames may be stored in a first-in, first-out storage method such that the oldest entry within the VRAM 130 is the first to be sent out to the video display 106 for displaying to the user during operation of the information handling system 100.

As described, the information handling system 100 may include a wireless network interface device 126. The wireless network interface device 126 may be a wireless adapter that can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless network interface device 126 may include one or more RF subsystems with transmitter/receiver circuitry, modem circuitry, one or more unified antenna front end circuits, one or more wireless controller circuits such as antenna adaptation controller, amplifiers, 5G antenna systems and other radio frequency (RF) subsystem circuitry for wireless communications via multiple radio access technologies and specifically to 5G NR wireless communication network. Each radiofrequency subsystem may communicate with one or more wireless technology protocols. The radiofrequency subsystem may contain individual subscriber identity module (SIM) profiles for each technology service provider and their available protocols for subscriber-based radio access technologies such as cellular LTE communications that provide for some 5G mm-wave communication. The wireless adapter may also include antenna systems which may be tunable antenna systems, directional antenna array systems, or may include an antenna adaptation network for use with the system and methods disclosed herein to optimize antenna system operation. Additional antenna system adaptation network circuitry (not shown) may also be included with the wireless interface adapter to implement WLAN or WWAN modification measures as described in various embodiments of the present disclosure.

In some aspects of the present disclosure, a wireless adapter (not shown) may operate two or more wireless links. In a further aspect, the wireless adapter may operate the two or more wireless links with a single, shared communication frequency band such as with the concurrent frequency range 1 (FR1) sub-6 GHz or frequency range 2 (FR2) antenna 5G LTE standard WWAN operations in an example aspect. For example, a 5 GHz wireless communication frequency band may be apportioned under the 5G standards for communication on small cell WWAN wireless link operation as well as other wireless activity in LTE, WiGig, or other communication protocols. In some embodiments, the shared, wireless communication bands may be transmitted through one or a plurality of antennas. Other communication frequency bands are contemplated for use with the embodiments of the present disclosure as well.

In other aspects, the information handling system 100 operating as a mobile information handling system may operate a plurality of wireless adapters for concurrent radio operation in one or more wireless communication bands or one wireless adapter concurrently operating plural antennas. The plurality of antennas may operate in nearby wireless communication bands in some disclosed embodiments. Further, harmonics, environmental wireless conditions, and other effects may impact wireless link operation when a plurality of wireless links are operating as in some of the presently described embodiments. The series of potential effects on wireless link operation may cause an assessment of the wireless adapters to potentially make antenna system adjustments according to the data retrieved by the orientation sensors 116 of the present disclosure.

The wireless adapter may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some embodiments, the antenna systems may operate as 5G networks that implement relatively higher data transfer wavelengths within a frequency range 1 (RF 1) between 450 and 7,125 MHz and frequency range 2 (FR2) between 24,250 and 52,600 MHz. In some embodiments, the antenna systems may operate as 5G networks that implement relatively higher data transfer wavelengths such as high frequency (HF) band, very high frequency (VHF) band, ultra-high frequency (VHF) band, L band, S band, C band, X band, Ku band, K band, Ka band, V band, W band, and millimeter wave bands. The wireless adapter may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). For example, in embodiments herein, one or more wireless adapters may control transceiving wireless signals in either millimeter-wave frequency bands such as 5G FR2, in sub-6 GHz frequency bands such as 5G FR1, or both. It is also understood that any number of available channels may be available under the shared communication frequency band in example embodiments. WLAN, for example, may also operate at a 2.4 GHz or a 5 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless adapter can represent an add-in card, wireless network interface module that is integrated with a main board of the information handling system or integrated with another wireless network interface capability, or any combination thereof. In an embodiment the wireless adapter may include one or more RF subsystems including transmitters and wireless controllers such as wireless module subsystems for connecting via a multitude of wireless links under a variety of protocols. In an example embodiment, an information handling system may have one or more antenna system transmitters for 5G small cell WWAN, Wi-Fi WLAN or WiGig connectivity and one or more additional antenna system transmitters for macro-cellular communication. The RF subsystems include wireless controllers to manage authentication, connectivity, communications, power levels for transmission, buffering, error correction, baseband processing, and other functions of the wireless adapter.

Figure 2:
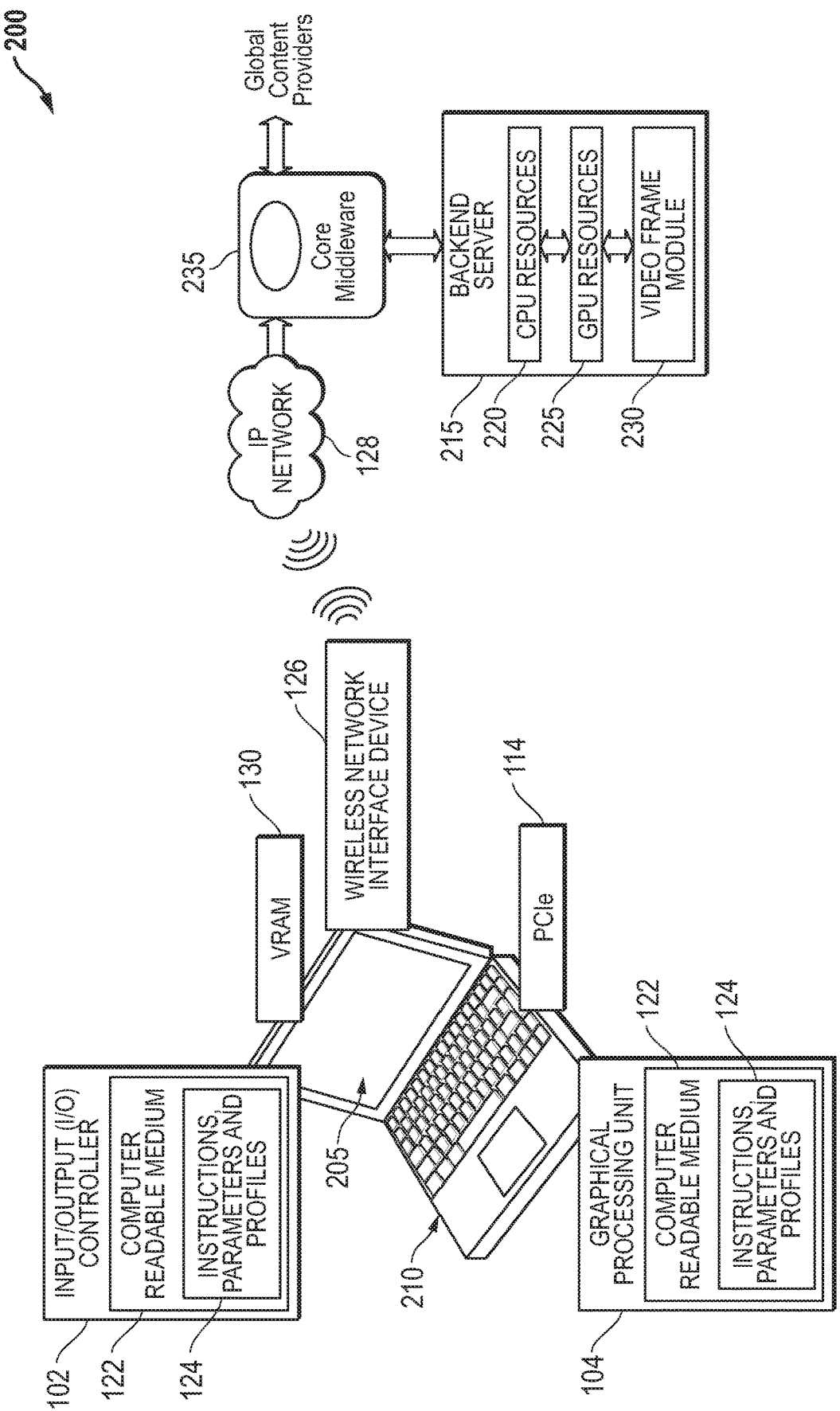
FIG. 2 is a block diagram illustrating an information handling system and backend computing resources over a 5G communication network according to an embodiment of the present disclosure.

FIG. 2 is a block diagram illustrating an information handling system 200 and backend computing resources over a 5G communication network according to an embodiment of the present disclosure. The information handling system 200 may include a display portion that houses a video display. The information handling system 200 may further include a keyboard portion that houses a keyboard. Although the present specification shows and describes the information handling system 200 as being a laptop computing device, the present specification contemplates that the information handling system 200 may be any type of thin computing device capable of communicating to a 5G communication network.

As described herein, the information handling system 200 may include an I/O controller 102. The I/O controller 102 may be any processor, controller, or other processing device that receives input data from any input device such as a mouse, a keyboard, or a touchscreen device among others. The I/O controller 102 may also be responsible for sending output to, for example, a display device of the information handling system 200. As described herein, a VRAM 130 may receive output data from a backend server 215 descriptive of one or more video frames displayed on the display device. In this embodiment, the VRAM 130 may communicate with the I/O controller 102 to present the output video frame data at the display device.

The information handling system 100 may further include a GPU 104. The GPU 104 may transmit graphics data across the 5G communication network 128 to the backend server 215. The graphics data may include any data used by the GPU 104 to define an image to be presented on a video display 205 of the information handling system 200. In an embodiment, this data may include primitive data, rasterization data, shading data, and vector data that originates from computer readable program code defining any type of application such as a word processing application, a gaming application, a computer-aided design (CAD) application, or any other type of application that receives input from a user via the I/O controller 102. Among these examples, a relatively high amount of graphical data, especially with CAD applications and gaming applications, are processed using the backend server 215 to which the information handling system 200 is communicatively coupled to via a 5G NR antenna and across a 5G communication network.

In an embodiment, the information handling system 200 may interface with a backend server 215 operating under a mobile backend as a service (MBaaS) model. In this example, the information handling system 200 may include SDKs and APIs that allow limited amounts of computer executable program code to be maintained on the information handling system 200 sufficient to allow the information to access and utilize storage, processing, and application resources across a communication network 128 (e.g., 5G NR communication network). In these embodiments, the resources offered by the backend server 215 may be offered to the information handling system 200 as a software licensing and delivery model (e.g., Software as a Service (SaaS)) in which software (e.g., computer executable program code) is licensed on a subscription basis and is centrally hosted at the backend server for use by the information handling system 200. As such, operations to be executed by the I/O controller 102 and the GPU 104 may be processed at the backend server 215 instead of the information handling system 200. This allows real-time input to be sent across the 5G NR communication network 128 by the I/O controller 102 and received at the backend server 215 along with any graphics data from the GPU 104 to be processed. Upon parallel or concurrent processing of the data received by the I/O controller 102 and graphical data received by the GPU 104, the backend server 215 may create an output video frame to be sent back to the information handling system 200 over the 5G communication network 128 and stored on the VRAM 130 for display at the video display of the display portion 205. This operation may occur for all input data received by the I/O controller 102 from any input device (e.g., mouse, keyboard, touchscreen) as well as for any graphical data sent by the GPU 104 to the backend server 215. The latency, dependency, and throughput capabilities of the 5G communication infrastructure enables the information handling system 200 to transmit user input to the backend server 215, have that input processed along with the graphics data described herein, and output (e.g., transmitted) back to the information handling system 200 within a single video frame. This results in little or no user-detectable lag or latency in data processing creating the illusion that the thin client device (described herein as the information handling system 100) is executing all processes while still reducing the hardware within the thin client and the power consumed. As a result of the reduced hardware present within the information handling system 200, hardware costs and information technology (IT) administration and support costs. Those resources at the backend server may be reallocated and/or allocated at real-time based on the amount of data to be processed from the information handling system 200. In examples where relatively high resource applications are being executed, the resources at the backend server 215 may be expanded to satisfy the computing needs.

In order to perform the processing actions described herein, the backend server 215 may include a number of CPU resources 220, GPU resources 225, and a video frame module 230. The CPU resources 220 may include any number of CPUs that receive input from the information handling system 200. In an embodiment, any amount of CPU resources 220 allocated to the information handling system 200 may be reallocated, increased, redistributed, or decreased, in real-time, based on the amount of data to be processed at the backend server 215. Similarly, the GPU resources 225 at the backend server 215 may be reallocated, increased, redistributed, or decreased, in real-time, based on the amount of data to be processed at the backend server 215.

The video frame module 230 may be any computer executable program code that is used to form a plurality of video frames to be sent to the information handling system 200. In an embodiment, the video frame module 230 may receive the executed data from the GPU resources 225 and combine that data to define a single video frame, one at a time, to be displayed on the video display of the computer system 200. In an example, the video frame module 230 may cause each video frame to be transmitted to a core middleware 235 to direct and coordinate the video frame back to the computer system 200.

The core middleware 235 may include any computer executable program code that provides a SaaS environment, a data platform as a service (dPaaS) environment, an infrastructure as a service (IaaS) environment, platform as a service (PaaS) environment, desktop as a service (DaaS) environment, a managed software as a service (MSaaS) environment, a mobile backend as a service (MBaaS) environment, a datacenter as a service (DCaaS) environment, an information technology management as a service (ITMaaS) environment, or a combination of any of these. In an embodiment described herein, the core middleware 235 may provide the computer system 200 with access to a global content provider such as an internet service provider, a telecommunication and data service provider, and a cable television provider, among others.

The PCIe module 114 may include a high-speed serial computer expansion bus standard used as the interface between the GPU 104 and I/O controller 102 and the wireless network interface device 126. In the embodiments described herein, the PCIe module 114 may be transparently bridged over the 5G communication network 128 to allow graphics APIs associated with the backend server 215 to directly access the GPU 104 and transmit the data used to form the frames at the backend server 215 as described herein. In an alternative embodiment, any graphics APIs (e.g., DirectX® API developed by the Microsoft® corporation of One Microsoft Way, Redmond, Wash., USA; OpenGL® developed by the Khronos Group; Direct3D® developed by Microsoft®, CUDA developed by NVIDIA® of Santa Clara, Calif., USA; and the video graphics array (VGA) standards) may be directly transported over the 5G communication network 128. The data link layer of the PCIe module 114 may interface with the open wireless architecture layer of the 5G NR wireless communication infrastructure in order to sequence any transaction layer packets (TLPs) that are generated by a transaction layer of the PCIe module 114, ensure reliable delivery of TLPs between the information handling system 200 and the backend server 215 via an acknowledgement protocol (e.g., acknowledge (ACK) and negative acknowledgement (NAK) signaling) that explicitly requires replay of unacknowledged/bad TLPs, and initialize and manage flow control credits. By bridging the PCIe module 114 over the 5G communication network 128 the high data transmission rates of the TLPs may be realized.

Figure 3:
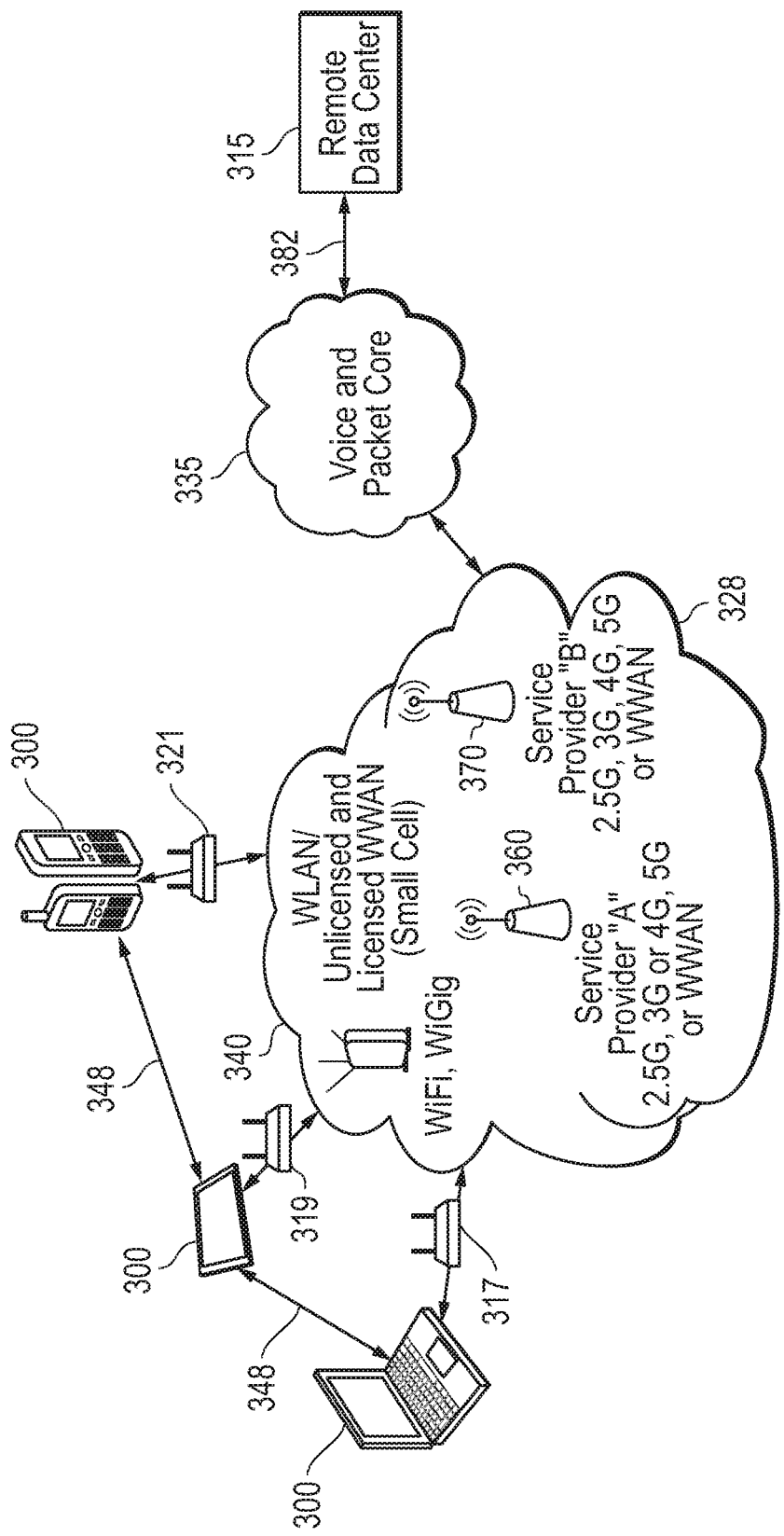
FIG. 3 is a block diagram of a network environment offering 5G wireless communication to a remote data center for a plurality of mobile information handling systems according to an embodiment of the present disclosure.

FIG. 3 is a block diagram of a network environment offering 5G wireless communication to a remote data center 315 for a plurality of mobile information handling systems 300 according to an embodiment of the present disclosure. FIG. 3 illustrates a macro- and micro-communication network that may include a plurality of individual communication networks that communicatively couples one or more information handling systems 300 such as the thin information handling system described in connection with FIG. 1 to one of these communication networks.

In a particular embodiment, network includes networked mobile information handling systems 300, 5G wireless access points 317, 319, 321, and multiple wireless connection link options. A variety of additional computing resources of network may include client mobile information handling systems, data processing servers, network storage devices, local and wide area networks, or other resources as needed or desired. As partially depicted, systems 300 may be a laptop computer, tablet computer, 360-degree convertible systems, wearable computing devices, a smart phone device, among other computing devices. These mobile information handling systems 300 may access a wireless local network 340, or they may access a macro-cellular network 328 via the access points 317, 319, 321. As described herein, the APs 317, 319, 321 may include Wi-Fi-enabled access point, private and public long-term evolution (LTE)-enabled access points, and 5G new radio (NR)-enabled access points and may include a plurality of each to allow for the mobile information handling systems 300 to communicate with the communication networks (e.g., a Wi-Fi communication network, a public LTE communication network, and a private LTE communication network, among others). Although FIG. 3 illustrates three APs 317, 319, 321, the present specification contemplates that the number of APs 317, 319, 321 may be more or less than three in order to form a multi-channel network that includes a Wi-Fi network, a 5G network, and a public and private LTE network, among others. In an example, the wireless local network 340 may be the wireless local area network (WLAN), a wireless personal area network (WPAN), or a wireless wide area network (WWAN). In an example embodiment, LTE-LAA WWAN may operate with a small-cell WWAN wireless access point option.

Components of a wireless local network may be connected by wireline or Ethernet connections to a wider external network. For example, wireless 5G NR-enabled or other local wireless APs 317, 319, 321 may be connected to a wireless network controller and an Ethernet switch. Wireless communications across wireless local network 340 may be via standard protocols such as IEEE 802.11 Wi-Fi, IEEE 802.11ad WiGig, IEEE 802.15 WPAN, or 5G small cell WWAN communications such as gNodeB or eNodeB, IEEE 802.11, IEEE 1914/1904, IEEE P2413/1471/42010, APs 317, 319, 321 implementing 802.11b, 802.11a, 802.11g, 802.11n, 802.11ac, and 802.11ax IEEE standards, or similar wireless network protocols developed for 5G, LTE, and Wi-Fi communications.

Alternatively, other available wireless links within network may include macro-cellular connections 328 via one or more service providers 360 and 370. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 340 and macro-cellular network 328 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 300 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna, a plurality of antennas, or an antenna array may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portion of wireless network 350 access points for Wi-Fi or WiGig as well as small cell WWAN connectivity may be available in emerging 5G technology. This may create situations where a plurality of antenna systems are operating on a mobile information handling system 300 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas.

The voice and packet core network 335 may contain externally accessible computing resources and connect to a remote data center 315, such as the backend server 215 described in connection with FIG. 2. The voice and packet core network 335 may contain multiple intermediate web servers or other locations with accessible data (not shown). The voice and packet core network 335 may also connect to other wireless networks similar to 340 or 350 and additional mobile information handling systems 300 or similar connected to those additional wireless networks. Connection 382 between the wireless network 340 and remote data center 386 or connection to other additional wireless networks may be via Ethernet or another similar connection to the world-wide-web, a WAN, a LAN, or other network structure. Such a connection 382 may be made via an access point/Ethernet switch to the external network and be a backhaul connection. The access point may be connected to one or more wireless access points before connecting directly to a mobile information handling system or may connect directly to one or more mobile information handling systems 300. Alternatively, mobile information handling systems 300 may connect to the external network via base station locations at service providers such as 360 and 370. These service provider locations may be network connected via backhaul connectivity through the voice and packet core network 335.

Remote data centers 315 may include web servers or resources within a cloud environment that operate via the voice and packet core 335 or other wider internet connectivity. For example, remote data centers may include additional information handling systems, data processing servers, network storage devices, local and wide area networks, or other resources as needed or desired. Having such remote capabilities may permit fewer resources to be maintained at the mobile information handling systems 300 allowing streamlining and efficiency within those devices and allowing thinner clients to operate as if additional hardware and software were present within the information handling systems 300. In an example where the mobile information handling system 300 includes streaming applications or other high data throughput application, those processing resources at the remote data centers 315 may supplement the high volume of processing used to provide those processes described herein. Similarly, remote data center 315 permits fewer resources to be maintained in other parts of network.

Although APs 317, 319, 321 are shown communicatively coupling wireless adapters of mobile information handling systems 300 to wireless networks 340 or 328, a variety of wireless links are contemplated. Wireless communication may link through a wireless access point (Wi-Fi or WiGig), through unlicensed WWAN small cell base stations such as in network 340 or through a service provider tower such as that shown with service provider A 360 or service provider B 370 and in network 328. In other aspects, mobile information handling systems 300 may communicate intra-device via 348 when one or more of the mobile information handling systems 300 are set to act as, for example, a 5G access point or even potentially a WWAN connection via small cell communication on licensed or unlicensed WWAN connections. Concurrent wireless links to information handling systems 300 may be connected via any access points including other mobile information handling systems as illustrated in FIG. 3. Again, during operation, any of the mobile information handling systems 300, I/O controller 102, the GPU 104, PCIe module 114 cooperate to dynamically, communicatively couple and redirect the mobile information handling systems 300 to and from, for example, a 5G mm-wave communication network in order to allow the information handling system 300 to connect to the 5G communication network 340, 328 and allow for processing of input and graphics data at a backend resource location such as remote data center 315 as described herein.

Figure 4:
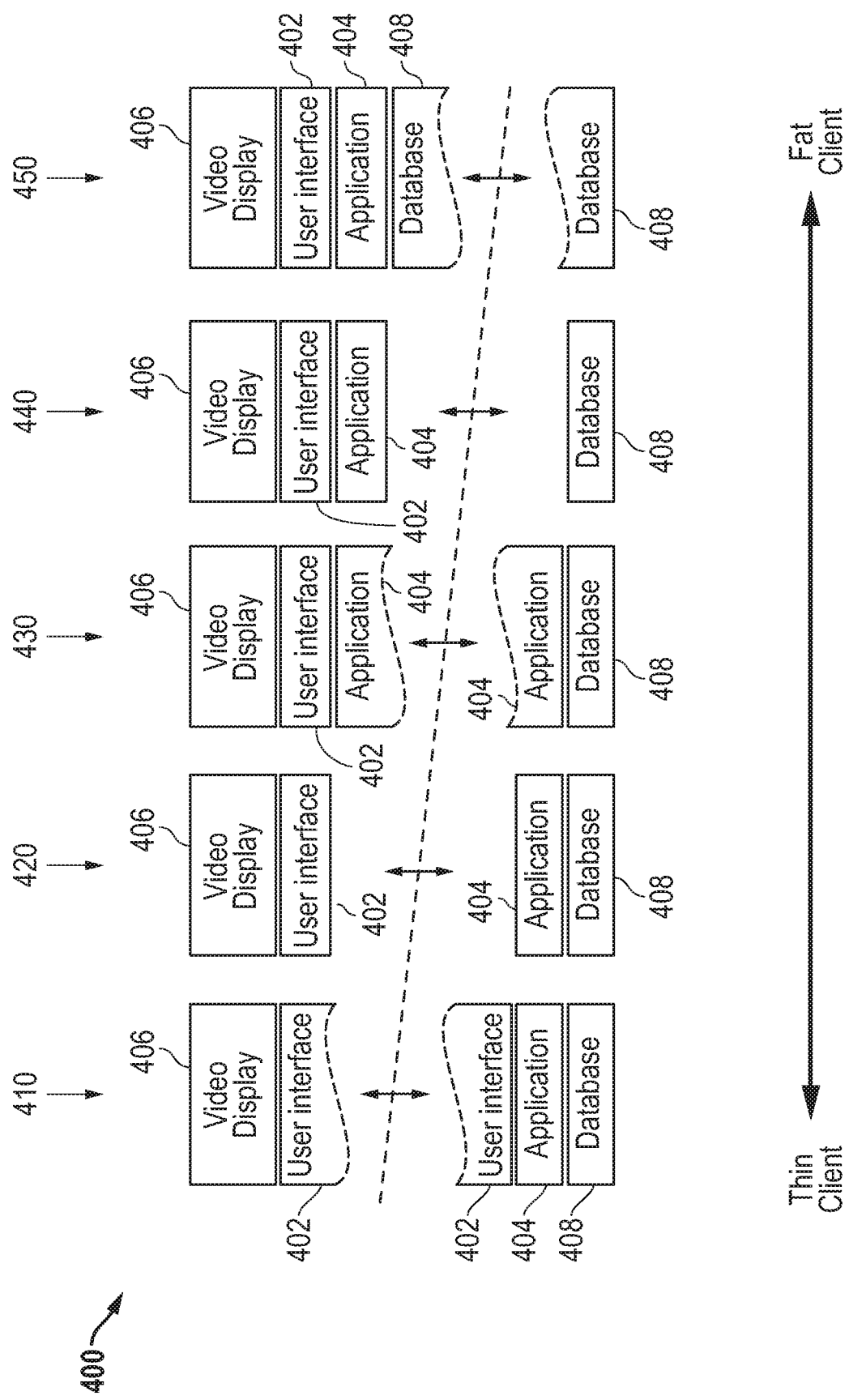
FIG. 4 is a graphical diagram illustrating distinguishing different types of information handling systems according to an embodiment of the present disclosure.

FIG. 4 is a graphical diagram illustrating distinguishing different types of information handling systems shown in a scale 400 according to an embodiment of the present disclosure. As described herein, the information handling system 410 may be a thin computing device or other type of thin client. A "thin" client, for purposes of the present specification, is an information handling system that has been optimized for establishing a remote connection with a server-based computing environment such as a data processing backend across a 5G communication network. The scale 400 depicts varying levels of shift of resources to backend processing from a fat client 450 to progressively thinner clients 440, 430, and 420 to a thin or skinny client 410 respectively. As such, some or all of the data processing that would otherwise be conducted on the information handling system is conducted at the backend server instead at the various levels of fat or thin clients as shown at 410, 420, 430, 440, and 450 in scale 400. Such data processing may include extended computing at everyday items including Internet of Things (IoT) systems that may monitor, provide services or information, or operate to control other systems at extended locations through places of work, residence, public spaces, or elsewhere. Other data processing may include graphics data processing previously computed by a graphical processing unit (GPU) of the information handling system that, according to the embodiments of the present specification, are processed by the at the backend server across the 5G communication network.

As indicated in FIG. 4, the present specification contemplates that a thin client may be any computing device that is capable of sending graphics data from a GPU and input data from an I/O controller to a backend server and receiving processed output data and video frame data from that backend server. In an embodiment, such processes that may be undertaken by a "fat" client 450 at processors and memory located on-board at a fat information handling system 450 includes execution of instructions to operate a video display 406, a user interface 402, an application layer 404, and at least a portion of a database 408. However, the present specification contemplates that the skinny or thin client such as 410 includes as little hardware and/or software as possible in order to reduce the weight, cost, and operational costs associated with the use of the information handling system 410 by shifting these functions and operations from on-board the thin client 410 to back end processing and memory resources via high speed and high bandwidth 5G wireless connectivity that would have been unavailable without significant lag or loss of data.

In an embodiment, the thin or skinny client 410 side of the scale 400 shown in FIG. 4, the information handling system 410 may include a video display with a user interface layer 402 partially executed by the information handling system 410 and partially executed through the use of a PCIe bridged transparently over the 5G communication network 128 to back end resources. As described herein, the thin client information handling system 410 may include as little hardware and software sufficient to allow the information handling system 410 to communicate graphic data from the GPU and input data from a user interface and I/O controller.

The thin client 410 depicted at the left-most example of an information handling system bifurcates the processing of input and graphics to be reflected as output on the video display 406. As described herein, during operation of the thin information handling system 410, the output is sent to a backend server over a 5G communication channel. In an embodiment herein, the input from the user at the mouse, the keyboard, or any other input device is detected in real-time, sent to the backend server, and processed by that backend server. Because of the high data transmission rates associated with the 5G NR communication network, the data from, for example, the I/O controller 102 regarding input at the mouse, the keyboard, and the touchscreen may be received concurrently with the graphic data from the GPU 104 from thin client 410. Upon parallel or concurrent processing of the data received by the I/O controller and graphical data received by the GPU, the backend server may create an output frame to be sent back to the thin information handling system 410 over the 5G communication network and stored on the VRAM for display at the video display. This bifurcates the operations of the user interface 402 with the user interface receiving input while the output is processed and displayed at the video display 406. This operation may occur for all input data received by the I/O controller from any input device (e.g., mouse, keyboard, touchscreen) as well as for any graphical data sent by the GPU to the backend server. The low latency, dependency, and high throughput capabilities of the 5G communication infrastructure enables the thin information handling system 410 to transmit user input to the backend server, have that input processed along with the graphics data described herein, and output (e.g., transmitted) back to the information handling system 410 within a single video frame. This results in little or no user-detectable lag or latency in data processing creating the illusion that the thin client device is executing all processes while still reducing the hardware within the thin client and the power consumed. As a result of the reduced hardware present within the information handling system 400, hardware costs and information technology (IT) administration and support costs. Those resources at the backend server may be reallocated and/or allocated at real-time based on the amount of data to be processed from the thin information handling system 410. In examples where relatively high resource applications are being executed, the resources at the backend server may be expanded to satisfy the computing needs.

FIG. 4 further shows a plurality of other information handling systems 420, 430, 440, and 450 with varying amounts of hardware and/or software from a thin client 410 described in the left-most example to a fat client 450 described in the right-most example. In each of these examples, despite there being more hardware and/or software present within the information handling system 420, 430, 440, or 450, the information handling system may still be operated as described herein with some portion of the input data and graphic data being sent concurrently over the 5G communication network to the backend server for processing to free up or limit power consumed and processing required on-board the client information handling systems such as 420, 430, 440, and 450. The present specification contemplates that even where a fat client 450 is used to initiate the methods and processes described herein, that the amount of energy used to process data is conserved at the information handling system while the processing is completed at the backend server. For example, a fat client 450 may utilize a 5G NR wireless link and transparent PCIe connectivity as a serial bus to shift operations of a user interface 402, application services 404, and database 406 to back end resources rather than utilized on-board processing resources and power. In these embodiments, the thinner the information handling system is, the costs associated with the information handling system are reduced. Specifically, the costs associated with hardware and/or software present at the information handling system as well as costs associated with IT administration may be eliminated the thinner the information handling system is made. Because the backend server is handling most if not all of the processing for the input and graphics, a thin information handling system 410 may also be made to be more compact, lighter to handle by the user, and with less cost.

Figure 5:
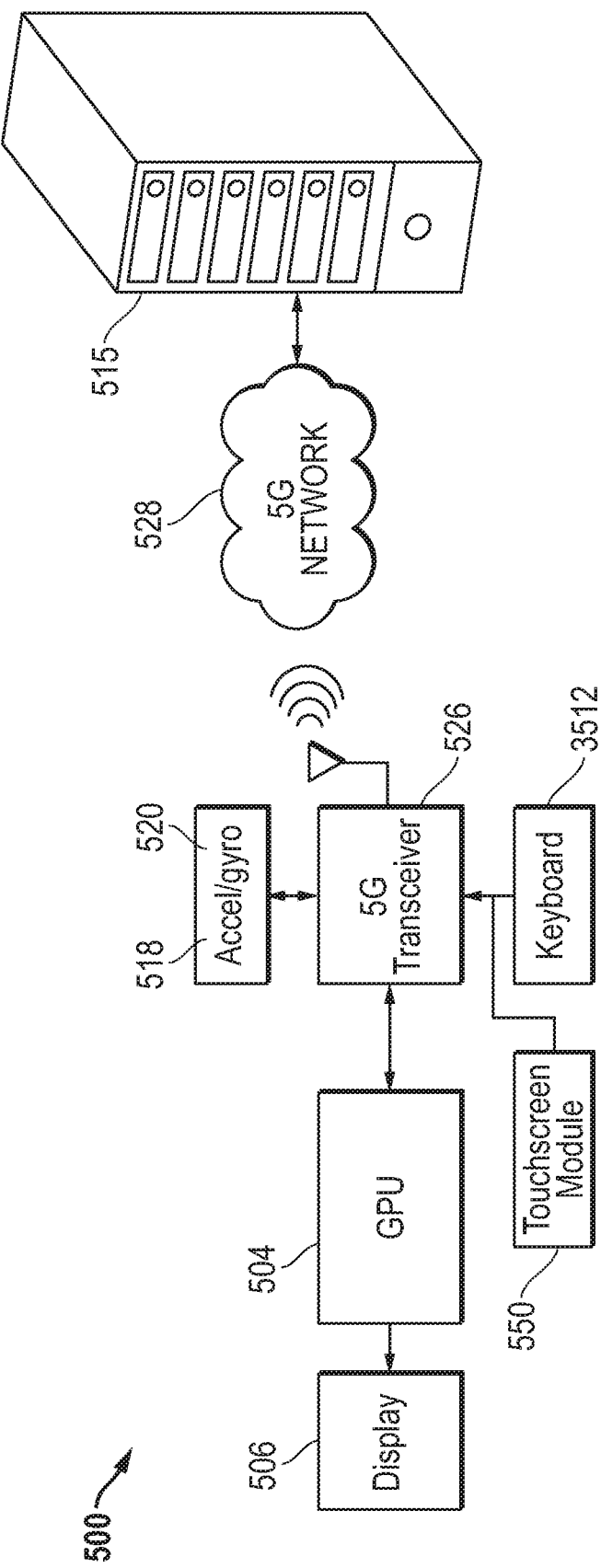
FIG. 5 is a block diagram illustrating a thin client information handling system and back end resources according to an embodiment of the present disclosure.

FIG. 5 is a block diagram illustrating an information handling system 500 according to an embodiment of the present disclosure. As described herein, the information handling system 500 may be in the form of a thin client with limited hardware and/or software sufficient to allow the information handling system 500 to communicatively couple to a backend server 515 over a 5G wireless network 528. Although FIG. 5 shows specific hardware and software presented in the information handling system 500, the present specification contemplates that additional hardware and software may be present in the information handling system 500 without going beyond the scope of the principles described herein.

The information handling system 500 may include a video display 506. The video display 506 may be any device that provides visual output to a user. In an embodiment, the video display 506 may include a touchscreen as a device used to provide input to the information handling system 500 and, in an embodiment, to an I/O controller (not shown). As described herein, the input received from any input device such as the touchscreen device associated with the video display 506 may be sent to the backend server 515 via the 5G wireless network 528. In an embodiment, the touchscreen may be communicatively coupled to a touchscreen module 550 that receives the input at the touchscreen and forwards that input data to a 5G transceiver 526 for transmission to the backend server 515 via the 5G wireless network 528.

The information handling system 500 may further include a GPU 504. The GPU 504 may transmit graphics data across the 5G wireless network 528 to the backend server 515. The graphics data may include any data used by the GPU 504 to define an image to be presented on the video display 506. In an embodiment, this data may include primitive data, rasterization data, shading data, and vector data that originates from computer readable program code defining any type of application such as a word processing application, a gaming application, a computer-aided design (CAD) application, or any other type of application that receives input from a user via the I/O controller. Among these examples, a relatively high amount of graphical data, especially with CAD applications and gaming applications, are processed using the backend server 515 to which the information handling system 500 is communicatively coupled to via a 5G transceiver 526 and across the 5G wireless network 528.

The information handling system 500 may further include a keyboard 512. The keyboard 512 may be any alphanumeric device such as a QWERTY-type keyboard that allows the user to interface with any data, images, or text presented to the user at the video display 506. Any input data, in an embodiment, may be relayed from the keyboard 512 to an I/O controller (not shown) for the I/O controller to send the output data to the backend server 515 via the 5G transceiver 526. Similarly, a touchpad, mouse, camera system, or gesture detection device (not shown) may receive user input and provide connectivity for back end 515 processing via connectivity through the I/O controller, 5G transceiver system 526, and via PCIe module wireless connectivity provided.

The information handling system 500 may further include any number of orientation sensors that detect the orientation of the information handling system 500 at any given time. Among these orientation sensors may include an accelerometer 518 and a gyroscope 520. The accelerometer 518 and gyroscope 520, along with any other type of orientation sensor, may gather orientation data descriptive of an orientation of the information handling system 500 and provide the orientation data to, for example, the I/O controller. The orientation data may be used by the information handling system 500 to detect which orientation the information handling system 500 is in so that any wireless network interface device and/or 5G transceiver 526 are to be activated or operated. In an embodiment, the information handling system 500 may include a 5G NR antenna or array of 5G NR antennas used to communicatively couple the information handling system 500 to one of a plurality of access points (APs) of the 5G wireless network 528. The APs may allow the information handling system 500 to be communicatively coupled to the backend server 515 within the 5G wireless network 528. In an embodiment, the information handling system 500 may be oriented into a tablet orientation, an open laptop configuration, or any other type of orientation. Based on these orientations, one or more 5G transceivers 526 or arrays of 5G transceivers 526 may be activated in order to communicatively couple the information handling system 500 to the backend server 515 over the 5G wireless network 528.

Figure 6:
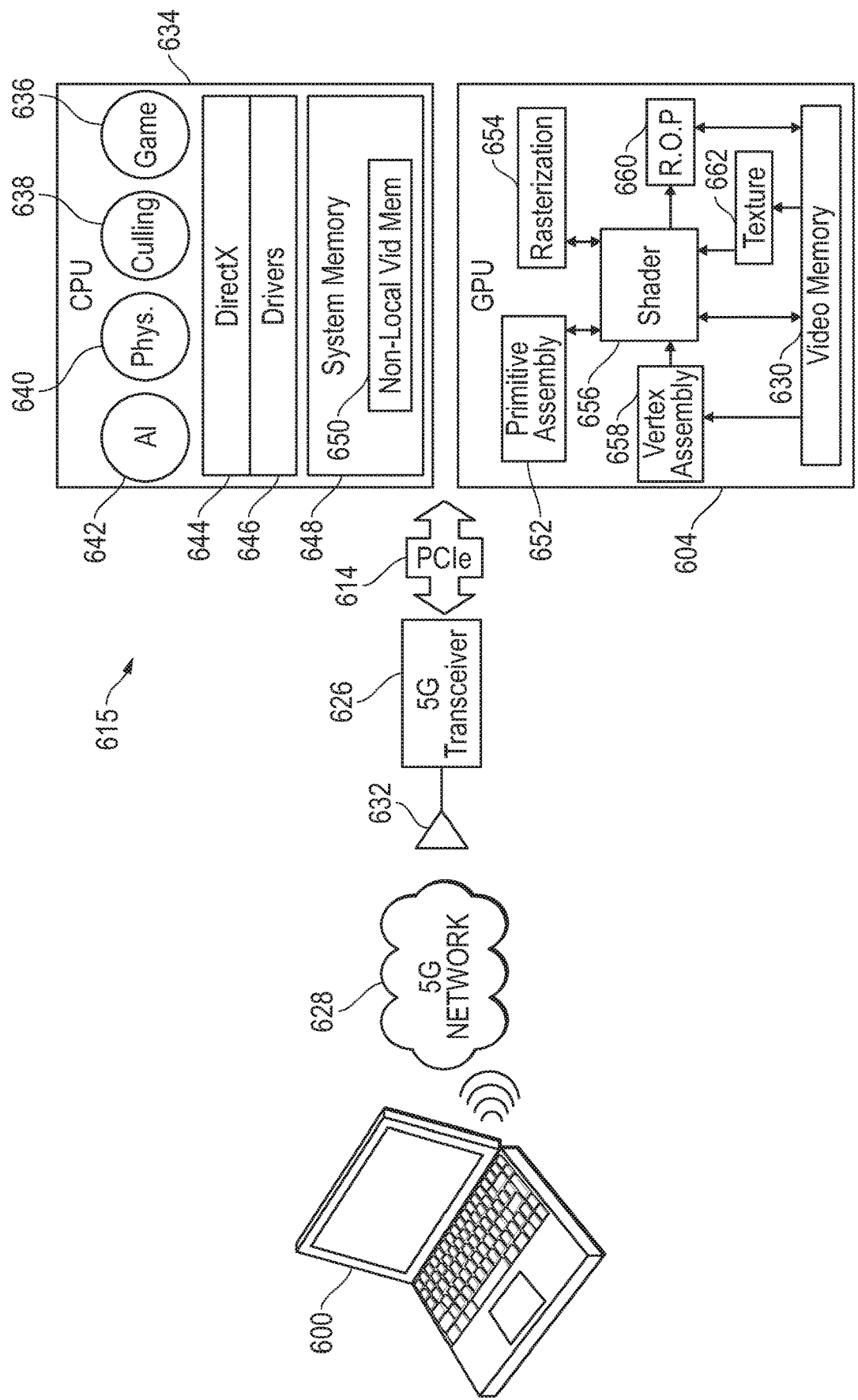
FIG. 6 is a block diagram illustrating an information handling system and back end resources according to an embodiment of the present disclosure.

FIG. 6 is a block diagram illustrating an information handling system 600 according to an embodiment of the present disclosure. FIG. 6 shows the information handling system 600 communicatively coupled to a backend server 615 that includes, at least, the processing resources used to process the input data from the information handling system 600 and graphics data from the information handling system 600.

In an embodiment, the backend server 615 includes a CPU 634. The CPU 634 may be any processing device or plurality of processing devices used to receive input data from the information handling system 600. In an embodiment, any amount of CPU resources 634 allocated to the information handling system 600 may be reallocated, increased, redistributed, or decreased, in real-time, based on the amount of data to be processed at the backend server 615. Similarly, the GPU resources 604 at the backend server 615 may be reallocated, increased, redistributed, or decreased, in real-time, based on the amount of data to be processed at the backend server 615.

In an embodiment, the CPU 634 may include an artificial intelligence module 642, a physics module 640, a culling module 638, and a gaming module 636. Each of these modules may be used, in connection with the GPU 604 to generate video frames at the VRAM 630 (video memory) for transmission back to the information handling system 600 as described herein. As described herein, these modules 642, 640, 638, 636 may interface with the GPU 604 to generate the graphics data used to form each of the individual video frames stored, temporarily, on the VRAM 630 and sent to a VRAM on the information handling system 600 for display at a video display. Modules 642, 640, 638, 636 shown an example set of user interface processing tasks that may be split from a thin client information handling system and conducted at a backend central processing unit (CPU) processing resource 634 or back end GPU processing resource 604 via PCIe module 614. PCIe module 614 may operate a transparent PCIe bridge via a wireless 5G transceiver 628, antenna 632, and 5G network 628 wirelessly with thin client 600.

In an embodiment, the artificial intelligence module 642 may receive input data from an I/O controller (not shown) at the information handling system 600 and perform machine learning algorithms on the I/O data. With this machine learning data created, the GPU 604 may process the data along with any data from the physics module 640, culling module 638, and gaming module 636 to create the video frames as described herein. The artificial intelligence 642 may provide data related to position-based 3D structures to be presented on the video display of the thin information handling system 600 and processing may be consumed by the backend GPU 604 during video frame development.

The physics module 640 may, in an embodiment, be used to create or simulate physical laws within, for example, a virtual environment or other visual environment presented at the video display. Again, the data produced by the physics module 640 may be received at the backend GPU 604 and processed to help define a video frame to be transmitted to the thin information handling system 600 via the 5G network 628.

The culling module 638 may be used to determine whether any polygon defining an image (e.g., a 3D-image) is visible on a 2D screen such as the visual display of the information handling system 600. Again, the data produced by the culling module 638 may be received at the backend GPU 604 and processed to help define a video frame to be transmitted to the thin information handling system 600 via the 5G network 628.

The CPU 634 of the backend server 615 may also include a gaming module 636. The gaming module 636 may be used, in an example, may be any type of computer readable program code or application-specific integrated circuit (ASIC) that renders 2D or 3D graphics, at real-time, including applications in Virtual Reality (VR), Augmented Reality (AR), Mixed Reality (MR) or any type of display.

The backend CPU 634 may also include a graphics APIs (e.g., DirectX® API developed by the Microsoft® corporation of One Microsoft Way, Redmond, Wash., USA; OpenGL® developed by the Khronos Group; Direct3D® developed by Microsoft®, CUDA developed by NVIDIA® of Santa Clara, Calif., USA; and the video graphics array (VGA) standards) that may be directly transported over the 5G network 628. As described, in some examples, a data link layer of the PCIe module 614 may interface with the open wireless architecture layer of the 5G network 628 infrastructure in order to sequence any transaction layer packets (TLPs) that are generated by a transaction layer of the PCIe 614, ensure reliable delivery of TLPs between the information handling system 600 and the backend server 615 via an acknowledgement protocol (e.g., acknowledge (ACK) and negative acknowledgement (NAK) signaling) that explicitly requires replay of unacknowledged/bad TLPs, and initialize and manage flow control credits. By bridging the PCIe module 614 over the 5G network 628 the high data transmission rates of the TLPs may be realized.

The backend CPU 634 may also include other driver resources 646, a system memory 648, and other non-local video memory 650 that may be used during the processing of the I/O data and graphics data from the information handling system 600. These drivers 646 and system memory 648 with its non-local video memory 650 may be used to interface and augment any processes conducted on the I/O data and/or graphic data processed by the backend GPU resources 604. In an embodiment, the backend CPU 634 may prepare and store any I/O data and/or graphics data prior to sending that data onto the backend GPU resources 604. This data may then be transferred to thin client 600 via a wireless 5G network connection 628 and PCIe module 614.

The backend GPU resources 604 may include any processor, computer readable and executable program code, and/or ASIC that allows for the generation of video frames at a frame by frame basis. In an embodiment, the backend GPU resources 604 may include a primitive assembly module 652. The primitive assembly module 652 may receive vertices data from the vertex assembly module 658 and assemble them into primitives or graphic elements, such as lines, curves, and polygons, which may be combined to create the more complex graphical images for each video frame created and transmitted to the information handling system 600 via a wireless 5G network connection 628 and PCIe module 614.

The backend GPU resources 604 may also include a rasterization module 654. The rasterization module 654 may, in an example, render the primitives from the primitive assembly module 652 into 2D pixels. The GPU resources 604 may also include a texture module 662. The texture module 662 may provide texture data related to what visual textures to apply to any primitive generated by the primitive assembly module 652. In an embodiment, the 2D pixels and the assembled primitive and texture data may be sent to a vertex/geometry/fragment shader module 656. The vertex/geometry/fragment shader module 656 may apply shading to any primitive generated by the primitive assembly module 652.

The backend GPU resources 604 may also include a rendered output module 660. In an embodiment, the rendered output module 660 may receive the textual and pixel data and process it, via matrix and vector operations, into a final pixel or depth value and cause a finished graphic frame to be sent to the VRAM 630 or other video memory in preparation for transmittal to the information handling system 600 via the 5G network 628.

As described herein and similar to the information handling system 600, the backend server 615 may include a PCIe 614. The PCIe module 614 may interface with the open wireless architecture layer of the 5G NR wireless communication infrastructure in order to sequence any transaction layer packets (TLPs) that are generated by a transaction layer of the PCIe 614, ensure reliable delivery of TLPs between the information handling system 600 and the backend server 615 via an acknowledgement protocol (e.g., acknowledge (ACK) and negative acknowledgement (NAK) signaling) that explicitly requires replay of unacknowledged/bad TLPs, and initialize and manage flow control credits.

The backend server 615 may also include any type of 5G transceiver 626 and antenna 632 used to communicate with the information handling system 600. In an embodiment, the 5G transceiver 626 and the antenna 632 may be used to communicate over a 5G NR communication network as described herein. Antenna 632 may be any antenna system suitable for use with 5G wireless connectivity and may be a directional antenna system for directional tuning adjustment between transmitters and receivers of a 5G AP for a back end server and a 5G antenna of a thin client information handling system. For example, the antenna 632 may be one or more directionally adaptable and tunable 5G antenna arrays for wireless communication with thin client 600. With the PCIe module 614 and the 5G network 628, the information handling system 600 and the backend server 615 may transmit large amounts of data descriptive of I/O data, graphics data, and processed video frames. With the architecture described in FIG. 6, any application to be executed on the information handling system's 600 behest may be executed completely at the backend server 615 while the information handling system 600 may be simplified to a GPU resources 604 with user input. Depending on the type of application software to be executed on behalf of the information handling system 600 (e.g., word processing application, browsing application, CAD application, among others), the resources at the backend server 615 may be reallocated and/or allocated at real-time based on the amount of data to be processed from the information handling system 600. The user, regardless of the type of application to be executed on behalf of the information handling system 600, may see real-time processing of input at the video display device as the backend server 615 generates a plurality of video frames responsive to the input received from the information handling system 600.

Figure 7:
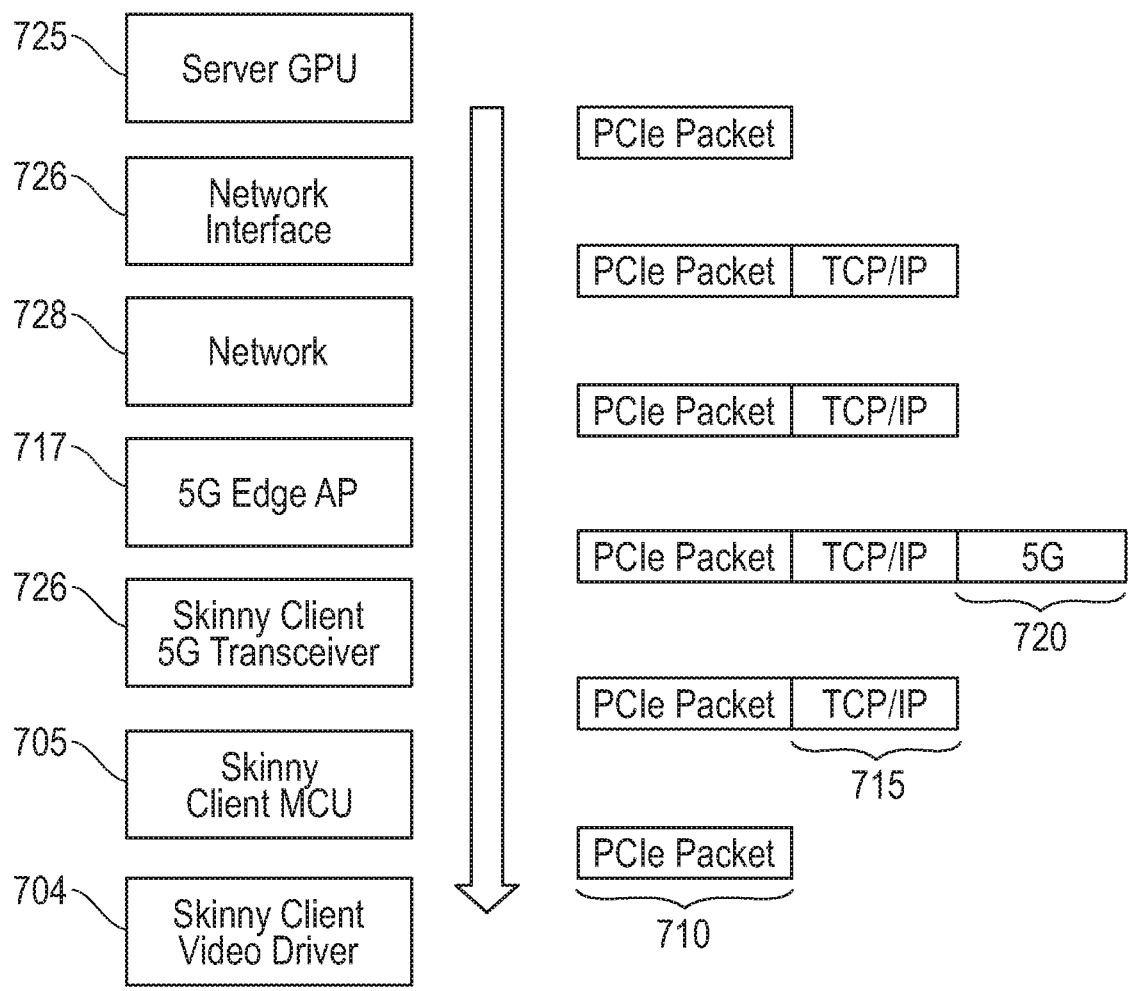
FIG. 7 is a block diagram illustrating a video packet structure for exchange between thin client information handling system and a backend server according to an embodiment of the present disclosure.

FIG. 7 is a block diagram illustrating a video packet structure 710, 715, 720 for packet exchange between an information handling system and a backend server according to an embodiment of the present disclosure. A data packet having a specific video packet structure 710, 715, 720 may include any number of header information and payload data as described herein. In a specific embodiment, a server or backend may provide the video payload data in the form of a video frame that has been processed by the backend or server GPU 725 as described in connection with FIG. 6 to a GPU of an information handling system. The information handling system and backend server include a network interface device 726 that is communicatively coupled to the 5G network 728. In an embodiment, the information handling system (e.g., thin or skinny client) may include a 5G transceiver 726, a microcontroller unit (MCU) 705, and a video driver 704. It is understood that packets and packet-structure as described may flow in either direction between a thin information handling system and backend server system or systems via a 5G wireless connection during operation of a thin client information handling system.

The video packet structure 710, 715, 720 described herein may include a component interconnect (e.g., the PCIe component interconnect descried herein) packet section 710, an TCP/IP packet section 715, and a 5G packet section 720. In an embodiment, the PCIe packet section 710 may be headed with the TCP/IP packet section 715 that includes information that allows the backend server to route the video payload data over a transaction layer, a data link layer, and a physical layer in that connects the backend server to the destination information handling system. The TCP/IP packet section 715 may also include information such as a destination information handling system IP address with a subnet that is associated with a domain of the PCIe component. The TCP/IP packet section 715 may also include other information such as, for example, an IP address of the backend server that may be used to confirm that the backend server sending the video payload data is within the proper subnet.

The TCP/IP packet section 715 may also include information such as TCP source port information and TCP destination port information that identifies the applications at either end of a TCP connected socket/port, and that may be used during the operations of the TCP. In this embodiment, the TCP/IP packet section 715 may indicate a GPU, MCU 705, or other processing device that receives the video packet data and displays that data on a display device of the information handling system (e.g., skinny client device). The video packet structure may also include application data that is being communicated from the backend server to the destination information handling system. The video packet structure provides an example of how TCP/IP data may be directly provided in the PCIe transaction layer protocol (TLP) and data link protocol (DLP) to provide TLP/DLP information that may be used to locally route the data packet over PCIe lanes established via a PCIe module across 5G NR wireless bandwidth.

The video packet structure 710, 715, 720 includes a 5G packet section 720. In an embodiment, the 5G packet section 720 may include data descriptive of the type of communication network the payload data is being transmitted over (e.g., 5G communication network) as well as the access points communicatively used to pass the payload data to the information handling system.

While a specific embodiment of the video packet structure has been illustrated and described, modifications to the video packet structure that still allow for the provision of the data packet from the backend server to the destination information handling system as taught herein are envisioned as falling within the scope of the present disclosure. Furthermore, while a few pieces of the information provided in the video packet structure have been described above, one of skill in the art will recognize the variety of uses available for the other information in the video packet structure for exchange of data between a thin client and one or more backend server resources wirelessly operating via PCIe transparent serial bus.

Figure 8:
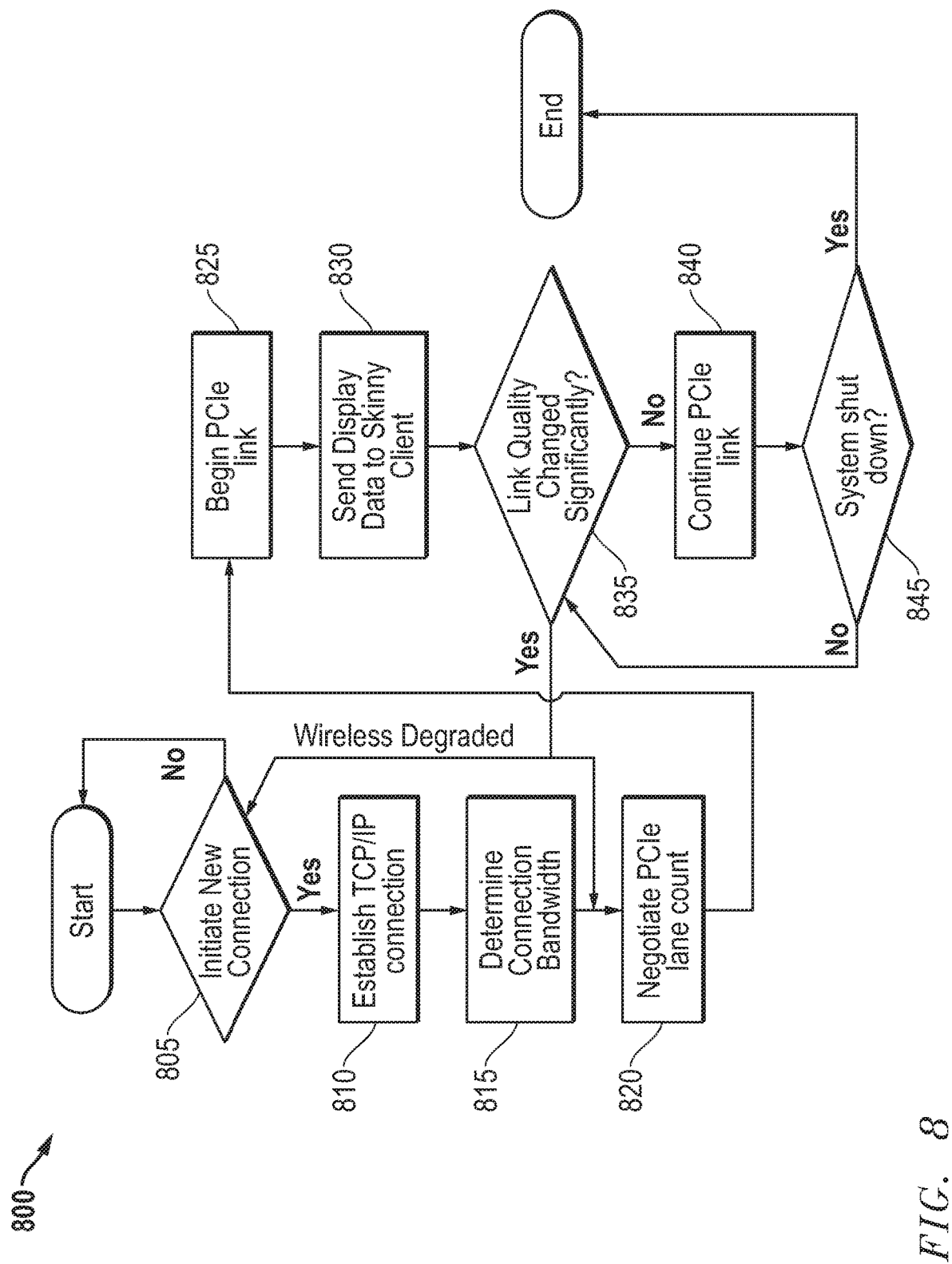
FIG. 8 is a flow diagram flow diagram illustrating a method of transparently bridging a peripheral component interconnect express (PCIe) connection across a wireless network according to an embodiment of the present disclosure.

FIG. 8 is a flow diagram flow diagram illustrating a method 800 of transparently bridging a PCIe bus connection across a wireless network according to an embodiment of the present disclosure. The method 800 may include determining whether a new connection has been initiated by an information handling system to the backend server described herein at block 805. A PCIe module at the thin client may access a wireless transmission system to establish a 5G wireless link to backend processing and memory resources. The method 800 may continually monitor for new connections at block 805 when no new connection has been detected (NO determination, block 805). Where a new connection is detected, the method 800 (YES determination, block 805) may continue with establishing a TCP/IP connection with the information handling system 810. The detection (block 805) and TCP/IP connection (block 810) between the backend server and the thin client information handling system may include any number of authentication processes used to confirm that the information handling system is capable and authorized to communicate over the 5G communication network to the backend server.

The method 815 may continue with determining, at block 815, the bandwidth available on the connection between the information handling system and the backend server. In the embodiments described herein, the information handling system communicates with the backend server over a 5G communication network. In some embodiments, more than one 5G wireless link may be established to ensure bandwidth and little or no latency in operation of the PCIe serial bus across the 5G wireless network. Although other factors may alter the final bandwidth available such as the number of users using the bandwidth, a 5G communication network may accommodate as much as 10 Gbps which may be as much as hundred times faster than, for example, 4G-based communication networks.

Once the level of available bandwidth is determined at block 815, the method 800 may continue with negotiating a PCIe lane count at block 820. As described herein, the lane count may be negotiated based on a number of lanes supported by the information handling system 100 and the bandwidth available on the 5G NR communication network. By way of example, a PCIe v4 may support ×1, ×2, ×4, ×8, and ×16 lanes. A maximum throughput on the 5G communication network may be around 10 GB/s which results in the maximum lanes of ×4. Where the quality is lower than this maximum, a lower lane count may be negotiated to maintain a quality of service of data transmission.

Upon negotiating of the PCIe lane count at block 820, the PCIe link may be started at block 825. This linking of the PCIe across the communication network at 825 allows the display data to be exchanged between the thin or skinny information handling system and backend server(s) processing and memory resources at block 830. As such, a transparent, wireless PCIe high speed bus may then be established between the thin or skinny client and the backend processing and memory resources made available to the thin or skinny client. As described herein, the skinny client may send graphics data or request graphics data to be sent to the GPU in order to display the display data on the display device of the skinny client. This is done so that the skinny client does not engage in the processing of any graphics data or engages in minimized graphics processing. Instead, the backend server may use a graphics processing unit to create video frames that are transmitted across the PCIe link directly to the GPU of the skinny client. In these embodiments, the GPU of the skinny client may be responsible for sending the video frames to the display device.

The method 800 may include continuously determining whether the link quality has changed such that transmission of the video frames over the bridged PCIe cannot be completed. Where it is determined that the PCIe bus quality has changed significantly, such as fallen below a bandwidth or speed level, link congestion, or reached a level of required retries so as to potentially prevent the transmission of these video frames (YES determination, block 835), the method 800 may continue at block 820 with again negotiating PCIe lane count as described herein. If loss of wireless connectivity occurs to cause the link quality to have changed significantly at 835 (YES determination, block 835) such as fallen below a bandwidth level or signal strength level, reached an interference level, reached a bit error rate, exceeded a jitter rate, or reached a level of required retries so as to potentially prevent the PCIe bus from operating transparently, flow may instead return to block 805 to initiate a new wireless connection and then proceed to establish TCP/IP connection, connection bandwidth, and negotiate PCIe lane counts as described. A wireless system may measure and determine the quality of the wireless link across a 5G NR connection between a thin or skinny client and a wireless system of a backend server or access point for connectivity to backend resources. Alternatively, where the link quality does not change (NO determination, block 835), the video frames may continue to be transmitted between the backend processing resources of the one or more backend servers and the GPU of the skinny client at block 840 via the established PCIe lanes. Flow may proceed to block 845 to determine if shut down of the skinny client has occurred. If shut down has not occurred, flow may continuously or iteratively return to block 835 to monitor whether the link quality of the 5G wireless link has change significantly to exceed or fall below a threshold as described and the method may proceed as described. If the skinny client information handling system has begun to execute shut down, then the method 800 may end when video frames are no longer requested from the skinny client.

Figure 9:
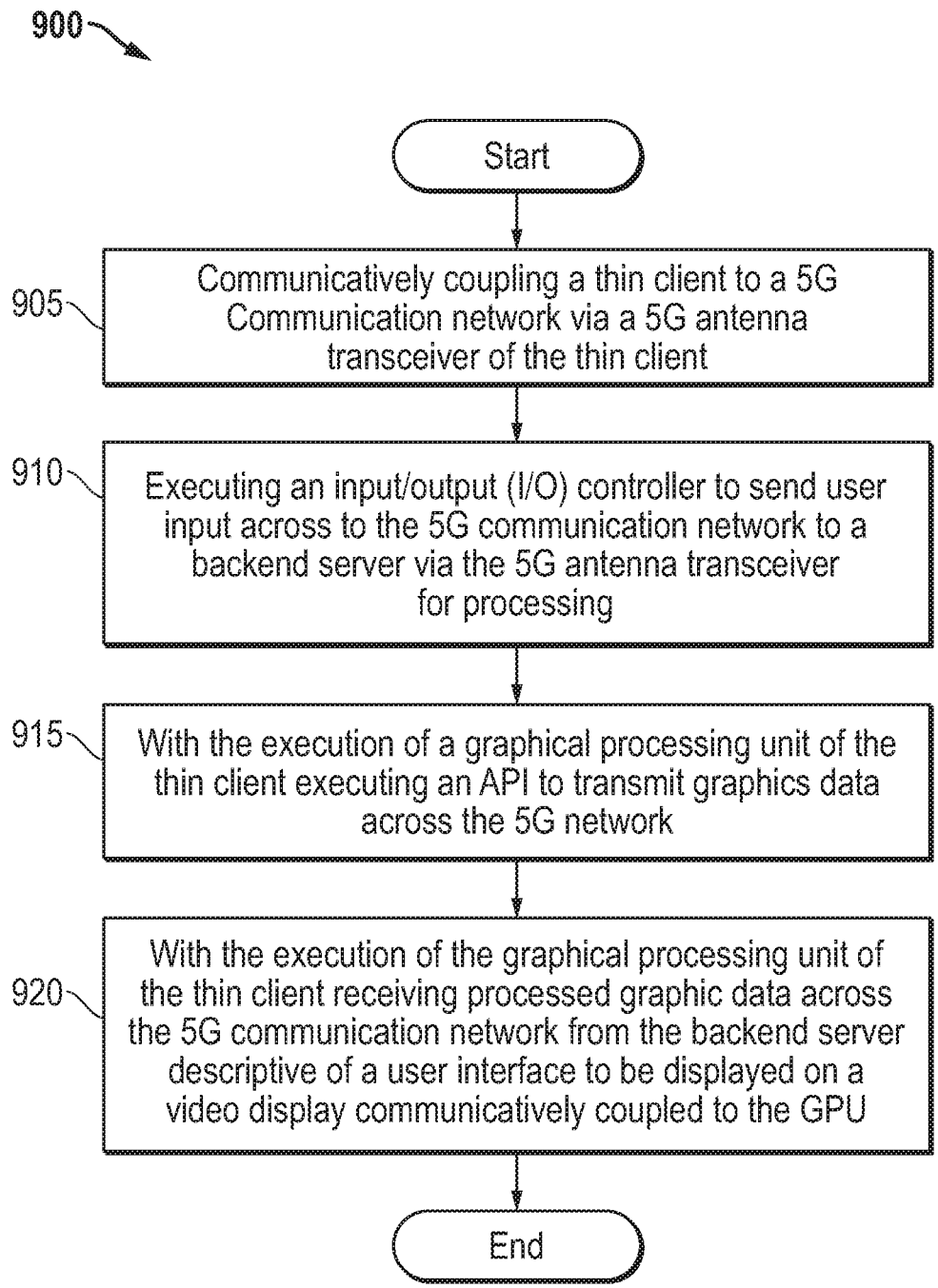
FIG. 9 is a flow diagram flow diagram illustrating a method of operating a thin client across a 5G infrastructure according to another embodiment of the present disclosure.

FIG. 9 is a flow diagram flow diagram illustrating a method 900 of operating a thin client across a 5G infrastructure according to another embodiment of the present disclosure. The method 900 includes, at block 905, communicatively coupling a thin client to a 5G communication network via a 5G antenna transceiver of the thin client. This communicative coupling may be accomplished by determining an orientation of the mobile information handling system using orientation sensors and activating any number of 5G NR antennas. Any type of authentication process may also be initiated in order to allow access to the 5G communication network by the information handling system and the present specification contemplates these types of authentication systems including the use of any subscriber identity module (SIM) within the information handling system.

The method 900 may also include executing an input/output (I/O) controller to send user input across to the 5G communication network to a backend server via the 5G antenna transceiver at block 910. The I/O controller may be any processing device that receives input from the input devices such as a touchpad, mouse, keyboard, or any other input device described herein such as a touchscreen at the video display. The input data is created via the use of the touchpad, mouse, keyboard, or touchscreen by the user. Upon receipt of this input data at the I/O controller, the I/O controller may send the user input across to a 5G communication network to a backend server via the 5G antenna transceiver. In an embodiment, in order to accomplish this the I/O controller may implement a PCIe bridged over the 5G communication network to allow any output/input application program interfaces (APIs) to directly access or allow direct access to the I/O controller.

The backend server may process that input data received from the information handling system. In an embodiment herein, the input from the user at the mouse, the keyboard, or any other input device is detected in real-time, sent to the backend server, and processed by that backend server. Because of the high data transmission rates associated with the 5G NR communication network, the data from the I/O controller regarding input at the mouse, the keyboard, and the touchscreen may be received concurrently with the data from the GPU of the information handling system so that input from the user is reflected in any generated video frame as described herein.

The method 900 may also include, with the execution of a graphical processing unit of the thin client, executing an API to transmit graphics data across the 5G network at block 915. In an embodiment, the information handling system includes a GPU. The GPU may transmit graphics data across the 5G communication network to the backend server which may also have backend GPU resources available. The graphics data may include any data used in whole or in part by the backend GPU to define an image to be presented on the video display. In an embodiment, this data may include primitive data, rasterization data, shading data, and vector data that originates from computer readable program code defining any type of application such as a word processing application, a gaming application, a computer-aided design (CAD) application, or any other type of application that receives input from a user via the I/O controller. Among these examples, a relatively high amount of graphical data, especially with CAD applications and gaming applications, are processed using the backend server to which the information handling system is communicatively coupled to via a 5G NR antenna and across a 5G communication network.

The method 900 may further include, at block 920, with the execution of the graphical processing unit of the thin client, receiving processed graphics data across the 5G communication network from the backend server, including backend GPU and backend CPU resources, descriptive of a user interface to be displayed on a video display communicatively coupled to the thin client GPU. As described herein, the video frames may be received frame by frame and maintained within a VRAM until the thin client GPU or other processor at the thin information handling system is to present those at the video display. In an embodiment, the VRAM may maintain any number of individual video frames and the thin client GPU may cause those video frames to be displayed on a first-in, first-out process.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

The blocks of the flow diagrams of FIGS. 8-9 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Aspects of several described embodiments herein may be implemented with the embodiments described in any of the FIGS. 8-9 described.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating as a thin client across a 5G infrastructure comprising:
    a processor and a memory;
    a video display for displaying graphics data;
    a wireless network interface device to communicate with a 5G communication network using a mm-wave antenna transceiver;
    an input/output (I/O) controller to receive user input data from an input/output device and to send the user input data received at the thin client across to the 5G communication network via a high-speed serial bus established via a 5G wireless link with the 5G communication network to an operatively coupled to a backend server in the 5G communication network to utilize backend graphics processing unit (GPU), backend central processing unit (CPU), and backend memory at the backend server via a 5G antenna transceiver to offload processing of the user input data with the graphics data for a graphical display; and
    a local GPU to:
        transmit the graphics data from the thin client across the 5G communication network to the backend server for processing the user input data with the graphics data at the backend GPU and backend CPU; and
        receive application program interface (API)-processed graphics data processed at the backend GPU across the 5G communication network from the backend server descriptive of a user interface to be displayed on the video display communicatively coupled to the local GPU at the thin client.

2. The information handling system operating as the thin client across the 5G infrastructure of claim 1, further comprising the high-speed serial bus is a transparent peripheral component interconnect express (PCIe) serial connection communicatively coupled to the GPU and via the 5G antenna transceiver and the 5G wireless link for bus connectivity across the 5G communication network.

3. The information handling system operating as the thin client across the 5G infrastructure of claim 1, further comprising an accelerometer and gyroscope to gather orientation data descriptive of an orientation of the information handling system and provide the orientation data to the I/O controller.

4. The information handling system operating as the thin client across the 5G infrastructure of claim 1, wherein the video display is a touchscreen and receives user input data from a user based on an orientation of the information handling system.

5. The information handling system operating as the thin client across the 5G infrastructure of claim 1, wherein the local GPU receives some portion of processed graphics data descriptive of a user interface to be displayed on the video display from the backend server and the backend GPU via the high-speed serial bus which is a transparent PCIe serial connection from the backend GPU at the backend server via the mm-wave antenna transceiver.

6. The information handling system operating as the thin client across the 5G infrastructure of claim 1, further comprising a video random access memory (VRAM) to receive the processed graphics data from the backend GPU of the backend server to maintain a number of frames to be displayed on the video display.

7. The information handling system operating as the thin client across the 5G infrastructure of claim 1, wherein the high-speed serial bus is a transparent PCIe serial connection from the backend server including the backend GPU and backend CPU processing resources communicatively coupled to the local GPU and the 5G antenna transceiver, via the 5G wireless link, to transparently bridge the thin client information handling system to the backend server to allow an executed API at the backend server to access the local GPU.

8. A method of operating a thin client across a 5G infrastructure comprising:
    communicatively coupling a thin client to a 5G communication network via a 5G antenna transceiver of the thin client establishing a 5G wireless link to a backend server in the 5G communication network;
    executing an input/output (I/O) controller to receive user input data from an input/output device at the thin client from a user and to send the user input data via a high-speed serial bus operatively coupling across the 5G wireless link with the 5G communication network to offload processing of the user input data from the thin client device to a backend server and backend server processing resources including backend graphics processing unit (GPU) via the 5G antenna transceiver;
    with the execution of a local graphical processing unit GPU of the thin client:
        transmitting graphics data across the 5G wireless link to the 5G communication network on the high-speed serial bus; and
        receiving application program interface (API)-processed graphics data from across the 5G communication network, where the API processes the graphics data with the user input data at the backend server processing resources and the graphics data is descriptive of a user interface to be displayed on a video display communicatively coupled to the local GPU.

9. The method claim 8, further comprising communicatively coupling a transparent peripheral component interconnect express (PCIe) serial connection to the local GPU and via the 5G wireless link from the 5G antenna transceiver as the high-speed serial bus for bus connectivity across the 5G communication network to the backend server.

10. The method claim 8, further comprising receiving orientation data descriptive of an orientation of the thin client and provide the orientation data to the I/O controller from an accelerometer and gyroscope communicatively coupled to the 5G antenna transceiver.

11. The method claim 8, wherein the video display is a touchscreen wherein the touchscreen includes an input/output device and receives input from a user as the user input data based on an orientation of the thin client.

12. The method claim 8, further comprising receiving some portion of processed graphics data descriptive of a user interface at the local GPU to be displayed on the video display from the backend server via the high-speed serial bus operatively coupled across the 5G communication network via the 5G wireless link to the backend server.

13. The method of claim 8, further comprising receiving, at a video random access memory (VRAM) communicatively coupled to the local GPU, the processed graphics data from the backend server and processed by the backend processing resources via the high-speed serial bus operatively coupled across the 5G communication network to the backend server to maintain a number of frames to be displayed on the video display.

14. The method of claim 8, further comprising transparently bridging a PCIe serial connection, communicatively coupled to the local GPU and via the 5G antenna transceiver, as the high-speed serial bus operatively coupled across the 5G communication network to the backend server to allow an API executed by the backend processing resources on the backend server to access the local GPU.

15. A thin client information handling system comprising:
a wireless network interface device to communicate via a 5G wireless link with a 5G communication network using a mm-wave antenna transceiver;
an input/output (I/O) controller to receive user input data from an input/output device at the thin client information handling system from a user and to send the user input data received via a high-speed serial bus operatively coupled across the 5G wireless link with the 5G communication network to a backend server via a 5G antenna transceiver;
a local graphical processing unit (GPU) to:
transmit graphics data across the 5G wireless link with the 5G communication network from the thin client information handling system to backend processing resources at the backend server to process the graphics data with the user input data; and
receive processed graphics data processed at the backend processing resources with an application program interface (API) from the backend server across the 5G communication network, where the processed graphics data is descriptive of a user interface to be displayed on a video display communicatively coupled to the local GPU at the thin client information handling system; and
the high-speed serial bus is a peripheral component interconnect express (PCIe) serial connection communicatively coupled from the local GPU and via the 5G wireless link with the 5G antenna transceiver to bridge the thin client information handling system to the backend server to allow execution of the API on the backend server with backend processing resources to access the local GPU.

16. The information handling system of claim 15, further comprising an accelerometer and gyroscope to gather orientation data descriptive of an orientation of the information handling system and provide the orientation data to the I/O controller.

17. The information handling system of claim 15, wherein the local GPU receives some portion of processed graphics data descriptive of the user interface via the 5G wireless link with the 5G antenna transceiver to be displayed on the video display.

18. The information handling system of claim 15, further comprising a video random access memory (VRAM) to receive the processed graphics data processed with the backend processing from the backend server via the 5G antenna transceiver to maintain a number of frames to be displayed on the video display.

19. The information handling system of claim 15, wherein the video display is a touchscreen and the touchscreen is the input/output device to receives the user input data from the user based on an orientation of the information handling system and the I/O controller transmits that user input data via the peripheral component interconnect express (PCIe) serial connection over the 5G antenna transceiver and the 5G wireless link to the backend processing.

20. The information handling system of claim 15, wherein the I/O controller transmits some portion of the user input data from the user interacting with the input/output device via the peripheral component interconnect express (PCIe) serial connection over the 5G antenna transceiver and 5G wireless link to the backend processing to process the user input data with the graphics data to be represented as output for display at the thin client information handling system video display via the 5G antenna transceiver and 5G wireless link.

* * * * *